United States Patent [19]
Moore

[11] 3,768,430
[45] Oct. 30, 1973

[54] LIGHT-WEIGHT, CRASH-RESISTANT, VEHICULAR BODY

[76] Inventor: Alvin Edward Moore, 916 Beach Blvd., Waveland, Miss. 39576

[22] Filed: Dec. 29, 1970

[21] Appl. No.: 102,318

Related U.S. Application Data

[63] Continuation-in-part of Ser. No. 803,672, March 3, 1969, Pat. No. 3,574,300.

[52] U.S. Cl. ............................................ 114/66.5 H
[51] Int. Cl. ................................................ B63b 1/20
[58] Field of Search ........................... 244/119, 125; 114/66.5 R, 68, 66.5 H; 115/1

[56] References Cited
UNITED STATES PATENTS

| | | | |
|---|---|---|---|
| 2,563,731 | 8/1951 | Masterson | 115/1 R X |
| 3,431,878 | 3/1969 | Moore | 114/66.5 H X |
| 3,443,776 | 5/1969 | Moore | 244/119 |
| 3,450,374 | 6/1969 | Moore | 244/119 X |
| 3,559,920 | 2/1971 | Moore | 244/119 |
| 3,574,300 | 4/1971 | Moore | 114/66.5 H |

*Primary Examiner*—Edward A. Sroka
*Attorney*—Alvin Edward Moore

[57] ABSTRACT

A wreck-resistant, light-weight, preferably barrel-curved, vehicular cabin or body, adapted for use in boats, cars, aircraft and space vehicles, comprising: light-weight, strong, cabin-wall, preferably endless ribs, preferably epoxy-bonded together in a fore-and-aft series; and waterproof skin means around the ribs. These ribs comprise gas-containing tubular members, sheathed in insulating material, which optionally may be light-weight concrete or foam plastic. Optionally, they may be in the form of straight or curved bars, preferably used in an internal partition or partitions in the cabin. The invention optionally includes vehicle-stabilizing balloon means, preferably comprising balloon bags within a streamlined sheath at the top of the cabin.

28 Claims, 10 Drawing Figures

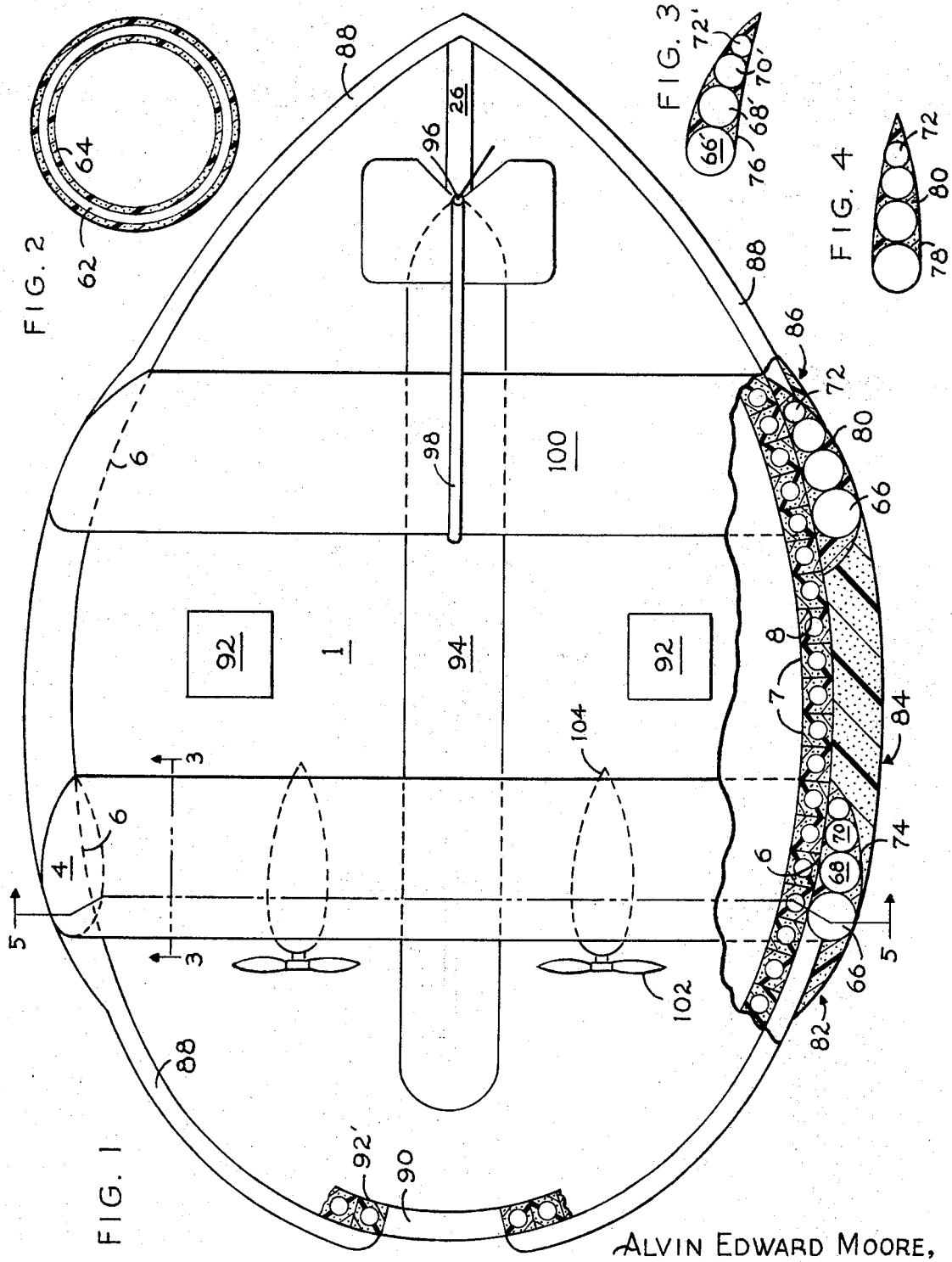

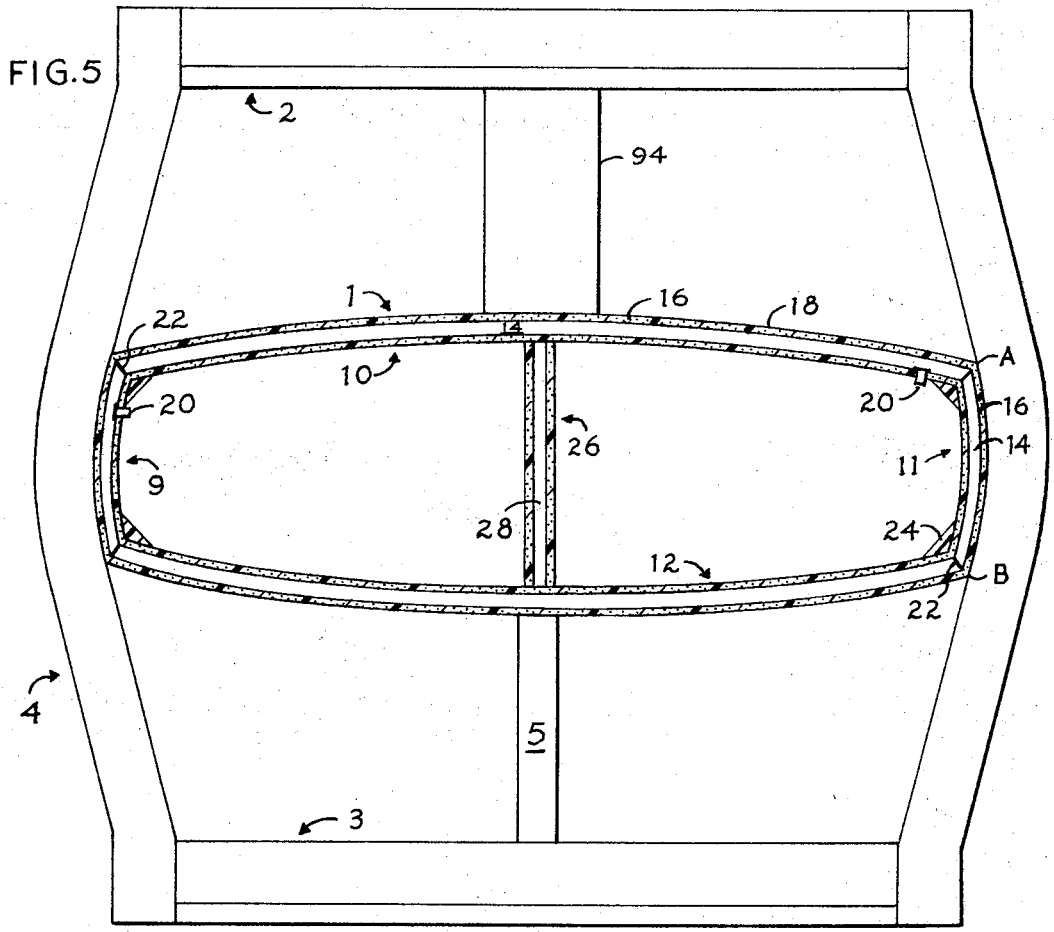
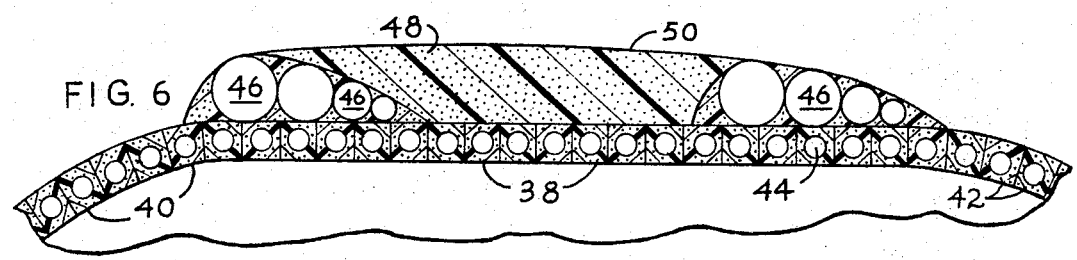
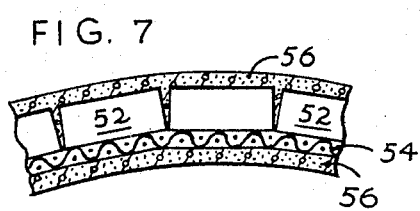
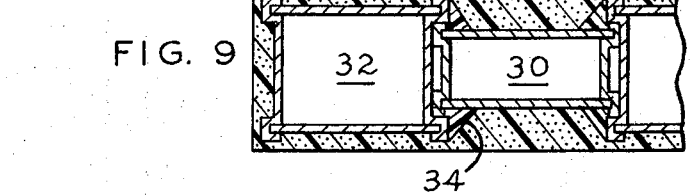
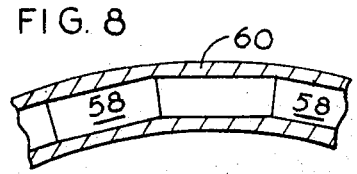
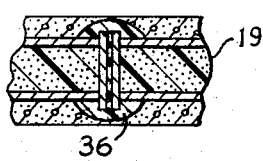
ALVIN EDWARD MOORE,
INVENTOR.
BY
Alvin E. Moore,
ATTORNEY.

LIGHT-WEIGHT, CRASH-RESISTANT, VEHICULAR BODY

This patent application is a continuation-in-part of Application Ser. No. 803,672, filed in the U.S. Patent Office on Mar. 3, 1969, U.S. Pat. No. 3,574,300 comprising nearly all of the matter pertaining to a vehicular cabin that was divided from the invention of a fluidfoil vehicle set forth in the prior application. The present drawing is the same as that of application 803,672 except for the showing of foam rubber as the insulating material around the cans of the construction rib or bar of FIG. 9 and the illustration of concrete as the insulating material around the cans of FIG. 10. The present specification is closely similar to the parts of the prior specification that pertain to a cabin.

The present invention relates to a very light-weight, very strong vehicular cabin that is highly resistant to damage from major shocks in collisions or crashes. Such a cabin is drastically needed in this time of crowded travel on and adjacent to the earth's surface.

Accordingly, some of the objects of the invention are to provide: (1) a cabin having walls that are barrel-curved (that is, arcuate in cross sections of the cabin in a fore-and-aft as well as a transverse direction); (2) a wreck-resistant vehicular body, comprising: a shock-resistant, substantially rigid cabin, having curved sidewalls; and resilient, shock-taking buffer means on the exterior of said sidewalls; (3) a vehicular body of the above-described type, in which the buffer means comprises a plurality of inflated tubes in a sheath of resilient foam plastic; (4) a vehicular cabin comprising a plurality of ribs (rings or bars) strongly joined together (preferably by epoxy cement) to form the cabin wall; and (5) ribs (rings or bars) of the above-described type, comprising cans imbedded in insulating material (foam plastic or concrete). These and other objects of the invention are indicated in the attached drawings and the following specification and claims.

In the drawings:

FIG. 1 is a top plan view of the vehicular body, shown as incorporated in a fluidfoil vehicle, broken away at its bow and on one side to indicate the cabin-wall and resilient buffer structure in section along a horizontal plane thru the longitudinal axis of the cabin.

FIG. 2 is a detail view of an optional, annular form of the cabin, in section from a midship plane that is normal to the cabin's longitudinal axis.

FIG. 3 is a detail view of an upper (or a lower) lift-providing means (a fluidfoil — optionally usable as connected to the said resilient buffer means) — shown as in section from the vertical plane 3—3 of FIG. 1.

FIG. 4 is a detail view of an alternative arrangement of the general type of means shown in FIG. 3 that is not in the shape of a fluidfoil (an upper or lower, vehicle-strengthening set of inflated tubes), shown as in section from the plane 3—3 of FIG. 1.

FIG. 5 is a front elevational view of the vehicle, shown as without the wing-supported motors and propellers of FIG. 1, with the cabin being illustrated as in vertical section from the planes 5—5 of FIG. 1.

FIG. 6 is a detail view of an optional form of the cabin sidewalls and the curved joints between the sidewalls and the resilient buffer means, shown as in section along a horizontal plane that contains the longitudinal axis of the cabin.

FIG. 7 is a detail view of an alternative type of the cabin walls, comprising an optional form of the buoyant tubular members and their sheaths, in section from a vertical plane that is normal to the longitudinal axis of the cabin. As positioned on the sheet of drawings this view illustrates a section of a top wall, but if turned thru 90° it indicates a side wall, and if turned upside down it illustrates a section of a bottom wall.

FIG. 8 is a detail view in section, comparable to FIG. 7, showing another type of cabin-wall structure.

FIG. 9 is a detail view, on a scale larger than that of the other figures, showing part of one of the tubular wall ribs or members of an optional form of cabin wall (preferably an interior wall), in section along a plane thru the tubular member's axis.

FIG. 10 is a detail view of part of an alternative type of tubular rib (preferably of an interior-wall frame), in section from a plane thru the longitudinal axis of the member.

Broadly, the invention comprises: a rigid or nearly rigid cabin, 1; resilient lift-providing means (shown as fluidfoils or wings), 2; below the cabin, two longitudinally-spaced, resilient cabin-supporting means, 3, which may support wheels, but as shown comprises hydrofoils or fluidfoil means; joined to each fluidfoil, a pair of shock-taking, resilient, lateral buffer means, 4 (which may be streamlined, with resilient fairings above and below the cabin); an optional, but preferable, resilient, central, cabin-supporting means, 5, fixed to the bottom of the cabin and to a top portion of each of the support means 3; and, optionally and preferably between the upper fluidfoil and the cabin, a balloon means, aiding in providing lift on the cabin and stabilization of the vehicle.

Several optional types of cabins, having curved walls of four different shapes, are disclosed. In each of these cabin forms, a cross-sectional vertical plane thru each resilient buffer and the adjacent cabin sidewall intersects the joint between the wall and buffer in a vertically arcuate curve. This curve, shown between points A and B in FIG. 5, insures that the upward force on the hydrofoil or wheels and/or the upward force of the upper lift-providing means is strongly transferred to the cabin, because of the vertically curved contact of the resilient buffer means and cabin walls, and it also aids in preventing fore-and-aft pivoting of the buffers due to force on the connected lower cabin supports and the upper lift-providing means. Preferably and as shown in FIG. 1 at 6, the cabin walls and these joints between the walls and the buffers are also arcuately curved in intersection with fore-and-aft planes. In the optional wall shape, shown in FIGS. 1 and 5, the exterior surface of the cabin walls is thus barrel-curved — that is, arcuately curved in both fore-and-aft and transverse directions. This barrel type of curvature has the great strength per unit of weight of barrel-shaped containers, and is thus a preferred part of the present invention of a very light-weight, very strong, buoyant-walled vehicle.

The joint between points A and B and the similar joints between other resilient buffers and wall portions, in each of the disclosed forms of cabins, may comprise bolts or other metallic fastening means; but preferably they consist largely or entirely of liberally applied epoxy cement or putty — material which when set is extremely adhesive and strong. Preferably also the joints between the upper and lower ends of the buffer means and the ends of the fluidfoils or other cabin supports comprise epoxy resin.

In each of the forms of the cabin, and as clearly illustrated in FIG. 1, the curved cabin comprises preferably endless arcuate ribs, 7, that are epoxy-bonded together along the junction planes 8 between their juxtaposed flat faces. In the cabin wall of FIG. 5 each composite endless rib member comprises four joined arcuate ribs, 9, 10, 11 and 12 and each of these ribs has: a central, elongated, sealed tube, 14 (or the optional set of cans of FIG. 7 or FIG. 8); tube-encompassing foamed plastic or similar integral, strong, insulating material, for example concrete preferably having aggregate of expanded shale or other light-weight material, 16; and an outer envelope of skin, 18. In FIG. 1 the planes of contact, 8, converge inwardly, toward the inner cabin space. In FIG. 6 there are such converging planes at the bow and stern, forming forward and rearward barrel-curved cabin portions, joined to a midship cabin portion that is annular (curved) in cross section, but is not barrel-curved.

Each of the tubular members 14 has a longitudinally-curved axis, is preferably round in cross section, and has a thin wall of strong material. This thin material preferably is metal (for example, aluminum alloy, magnalium or steel), but optionally it may comprise textile or metallic fabric that is impregnated and coated with natural or synthetic rubber or other plastic. For extra strength, with light weight, these tubes 14, as well as the optional other types of wall-frame tubular members shown in FIGS. 7, 8, 9 and 10, preferably are filled with gaseous material. This gaseous material optionally may be: air, or preferably lighter-than-air, non-aerial gas such as helium, nitrogen, or hydrogen mixed with a small percentage of carbon dioxide or other combustion-inhibiting gas; or, as indicated in FIG. 10, gas-cell-containing foamed plastic, 19, that is optionally under above-atmospheric pressure due to placing sufficient amounts of foam-producing gas and liquids inside the sealed tubes to pressurize the resulting plastic foam. When the tube walls are of flexible fabric and plastic each of them is filled and preferably pressure-inflated with such foam plastic, or else it is inflated with gas at a pressure well above that of the atmosphere — for example, at 20 pounds per square inch. Each gas-strengthened, endless, composite rib member has at least one gas inlet valve, 20, of the general type of automobile tire valves. When the junctions 22 have small holes in them, each end-joined group of tubes that are thus in flow-communication is provided with only one gas-inlet valve; but for extra vehicular safety each tube is preferably sealed at each end and has one valve. When the tube walls are metallic the gaseous material in them is permanently and hermetically sealed; and the gas-inlet elements 20 in this case are permanently sealed, and may be short lengths of tube, sealed by welding or solder.

The junctions 22 between tube ends comprise end disks that are strongly bonded to the tubes and to each other. Preferably these disks are of the same material as the hollow parts of the tubes. When they comprise fabric and plastic they are bonded to the tubular hollow parts and to each other with epoxy-resin cement or putty; when they are metallic they may be thus bonded, or optionally they may be brazed, welded or soldered to the hollow parts and to each other. The ends of the tubes and of their sheaths of foamed plastic or the like are further strengthened by braces 24 which may comprise metallic angle braces and/or epoxy putty.

The skin 18 of the cabin of FIG. 5, as well as a similar outer skin on each of the other disclosed types of cabin walls may be sheet rubber or comprise fabric and plastic or, if the cabin is rigid may be thin sheet metal or epoxy coating. It is preferably bonded to the endless ribs with epoxy or other strong cement. When it comprises fabric and is to be in much contact with water at least its bottom and side portions are of copper mesh (for example, copper screening) which is impregnated with rubber or other plastic but is only thinly coated with the plastic, thus preventing or reducing the adherence of marine-life forms to the cabin. Alternatively, at least the bottom and side parts of the skin may be a coating of air-set rubber cement heavily mixed with copper dust or filaments, or sheet material of rubber that is heavily impregnated with such copper particles.

As shown in FIG. 5, the cabin has a width that is large in relation to its height and that aids in achieving much lifting force and substantial lateral stability from the resulting wide fluidfoils. In view of this width, an optional interior partition, 26, is provided for extra cabin strength. This wall, which extends from the stern to a point spaced aft from the central bow window, preferably is of strong buoyant construction, optionally comprising tubular members 28 that are similar to 14, except that they are straight. These tubular members optionally may comprise rows of sealed, end-joined cans such as are shown in FIG. 9 or FIG. 10 and optionally may have horizontal axes, but as shown in FIG. 5, they are vertical. In addition to a tube or row of cans, each interior-wall, bar-like, rectangular-in-cross-section element, which is preferably square in cross section, comprises molded foamed plastic that surrounds the tube or row of cans, and optionally may comprise a skin, square in cross section, that envelops the foamed plastic. The tubes or cans may be filled with gas, which may be pressurized, or foamed plastic; and the bar-like elements are epoxy-glued together to form the wall.

In FIG. 9, the illustrated row of end-joined cans comprises a small-diameter can, 30, having end caps that nest within recesses in the end caps of an adjacent pair of larger cans, 32. Preferably the can ends are strongly bonded together with epoxy cement or putty, 34, or with brazing, welding or solder.

In FIG. 10, the wall-frame tubular member comprises cans of the same diameter that may be end-bonded by brazing, welding or solder; but preferably they are end-joined with epoxy cement or putty, 36; and each such tubular member is encased in light-weight concrete or foam plastic (optionally sheathed in a skin of fabric, metal or the like, thus forming a bar-like wall member of the above-described type. Optionally, these cans, filled with gas, may be joined and sheathed with the solidified molten metal 60 of FIG. 8.

Sectional FIG. 6 shows a lateral, midship portion of a cabin that is somewhat like that of FIG. 5 but comprises a group of coaxial endless main rib members, 38 (optionally composite endless rib members that comprise four arcuate ribs 9–12 that are end-joined as indicated in FIG. 5 at 22). These main rings or members, , as exampled in FIG. 6, are of the same peripheral extent and are epoxy-glued together to form a strength-providing middle part of the cabin wall that is not barrel-curved, but instead is of equal areas in cross sections normal to its axis. The bow and stern portions of the cabin are streamlined and barrel-curved as shown in FIG. 1, and comprise endless bow rib members 40 and stern rib members 42 that are wedge-shaped in cross sections that contain the cabin's longitudinal axis. The set or row of end-joined tubular members 44, imbedded in foamed plastic or the like, forming a strength-providing tubular element of each rib member, may be like the end-joined tubes 14 or the curved, endless row of end-joined cans that is indicated in either FIG. 7 or FIG. 8.

The main difference between the forms of the invention exampled in FIGS. 1 and 6 are: (1) In FIG. 1 the cabin has no cylindrical middle part, but instead, as illustrated in FIG. 5 as well as FIG. 1, it is barrel-curved, having a midship portion of greatest bulge, and curvingly sloping from each point of this bulge to the bow and to the stern. This barrel curvature provides great strength per unit of volume and per unit of weight of the cabin wall, capable of taking severe blows from outside (for example, blows of storm turbulence) without damage and without necessity of heavy wall structure. Under such a blow the tubular members and the inwardly converging flat sides of the rib members tend to jam together and reinforce each other against the force. Unlike the main rib members 38 of FIG. 6, the main rib members of FIG. 1 (those in the midship part of the cabin) have such inwardly converging sides. But the bow and stern rib members (40 and 42) of both FIG. 1 and FIG. 6 have converging sides. (2) When upright buffering tubes (for example, 66, 68, 70 and 72) are attached to the barrel-curved midship part of FIG. 1, the above-mentioned streamlined fairing of the portions of these tubes above and below their joint with the cabin wall (indicated by curved broken lines in the top left portion of FIG. 1) is necessarily thicker than the comparable fairings of FIG. 6. Due to the cylindrical middle section of the cabin wall of FIG. 6, the resilient tubes 46 of the shock-taking buffer means and their enveloping flexible sheath are so arranged relative to the cabin that in their upright portions below and above the cabin sidewalls they present little resistance to the fluid current of vehicular travel, and so their fairings have little drag. Their drag is further alleviated by fairings that are located at their areas of contact with the cabin's sidewalls. Each of these fairings comprises foamed plastic 48 (preferably stiffly resilient foamed natural or synthetic rubber) and an enveloping, preferably fabric-and-plastic envelope or skin, 50.

The type of cabin structure indicated in FIG. 7 may be barrel-curved as in the middle cabin portion of FIG. 1 or cylindrically curved as in FIG. 6. Each cabin rib, which is preferably endless, comprises: a row of sealed cans, 52, that optionally are filled with gas or foamed plastic that may be pressurized; an inner, endless strip, 54, of metallic fabric (for example, expanded aluminum or steel, hardware cloth, copper mesh or fence wire); epoxy glue that strongly bonds the strip 54 to each can; and mold-formed integral insulating material (plaster, mortar or concrete), 56. This material preferably comprises portland cement and light-weight aggregate such as expanded shale or clay, vermiculite, pumice or globules of rigid foamed plastic. Instead of this light-weight, insulating concrete, which coats and impregnates the mesh 54 and strongly fills and braces the wedge-shaped spaces between can ends, molded foamed plastic, or cast metal of the type shown at 60, may be utilized. And instead of the strip 54, common pipe strap (an apertured band) may be used.

FIG. 8 illustrates a portion of a cabin rib (endless or having ends) that comprises: end-joined cans 58, which contain gas that may be pressurized (or optionally may contain foamed plastic); and cast metal 60 (preferably aluminum, aluminum alloy, magnesium alloy or other light-weight metal) that surrounds and bracingly holds the cans together in a strong cabin rib. Optionally, the rib may be further strengthened by epoxy-gluing, brazing or soldering the adjacent disks of the can ends together before casting the metal on and around them. For the cans 58, cans of the more common type shown at 52 may be utilized. In this event that cast aluminum or other cast metal fills the wedge-shaped spaces between parts of the flanged can ends, thus further strengthening the rib.

The endless cabin rib member that is indicated in FIG. 2 forms part of a barrel-curved or cylindrically curved cabin that is round in cross sections. This rib comprises: an endless, circular, tubular hoop, 62; foamed plastic 64 (or light-weight concrete), surrounding the hoop; foamed plastic or gas, either of which may be under above-atmospheric pressure, sealed within the hoop; and, optionally, an outer skin of textile or metallic fabric. The foamed plastic is preferably substantially rigid; and the circular, thin-walled hoop or tube may be a bent and end-joined extruded tube of metal or strong, dense plastic; or it may comprise stamped annular tube halves that are sealingly bonded together with epoxy, brazing, welding or solder. The tube 14 also may be constructed in either of these ways.

The resilient buffer means and the cabin-supporting means which optionally may be connected to the buffers preferably comprise joined, resilient, tubes of different diameters that are constructed and fore-and-aft arranged to form strengthening tubular members that are contiguous to fluid-dynamic or streamlined skins. Each buffer comprises tubes, 66, 68, 70 and 72 that are vertically curved, forming the above-described vertically arcuate joint, in contact with the vertically curved cabin wall; and each fluidfoil or other cabin-supporting means comprises tubes 66', 68', 70' and 72' that respectively are of the same diameters as tubes 66, 68, 70 and 72 and end-bonded to the buffer tubes.

These tubes, as well as the similar buffer tubes 46 of FIG. 6, preferably are strongly resilient. When they are made of thin spring steel, resilient phosphor bronze, or spring-steel mesh impregnated and coated with strongly resilient rubber, the air, other gas or strongly resilient foamed rubber that is in them may be at atmospheric pressure; but such low pressure is not preferred. Instead, they preferably are filled with gaseous material (air, non-aerial gas or gas-cell-containing plastic) that is well above atmospheric pressure; and preferably they are of thin, highly-ductile and fracture-resistant metal (for example copper) or of textile or metallic fabric that is impregnated and coated with strongly resilient rubber and inflated with helium, nitrogen, air, or hydrogen mixed with combustion-inhibiting gas, under a strong pressure, for example in the range of 20 to 40 pounds per square inch. When of sheet metal they are permanently inflated and sealed; when of fabric and plastic they are either filled with strongly resilient foamed rubber or inflated and repeatedly inflatable thru rubber-tire-type inflation vlaves 20.

Preferably each of the tubes is separately inflated; and it is optionally joined at each of its ends to other tubes of a cabin-encompassing, rib-strengthening set of tubes with disks (that are angled to that of its axis) and bonding material that are similar to junctions 22 of FIG. 5. Or the ends of the tubes may be flattened and bonded, and the flattened ends then joined.

The streamlined, outer-shape-forming, fabric-and-plastic envelope (74 in FIG. 1; 76 in FIG. 3; 78 in FIG. 4) is preferably stretched tautly over the tubes (which are glued together with flexible rubber cement or epoxy). Then thru a small sealable opening the foam-plastic liquids are inserted. These liquids form the strongly resilient foamed-plastic filler 80 that is between the tubes and each envelope. Together with the bonded-together tubes this filler is sufficiently strong to hold the envelope in its normal position against minor shocks of turbulence, but in major shocks of storm or collision the resilient fluidfoils and supports have a tendency to bend, and then return to their former shapes without damage.

Optionally, the buffer tubes and elongated cabin tubes may be formed of extruded metal or dense plastic, curved in a die; or straight extrusions may be end-sealed, inflated and then bent to the desired curves. Also optionally, the buffer tubes may comprise gas or plastic-filled cans 52 and may be mold-formed as generally indicated in FIG. 7. In this event, the fabric or mesh 54 is flexible and preferably resilient, and the material 56 comprises strongly resilient foamed plastic, which preferably is within and glued to a buffer or cabin skin.

Preferably resilient fairings 82, 84 and 86, comprising flexible fairing skins and strongly resilient foamed plastic, are bonded to the exterior sidewall surfaces of the cabin, to reduce the drag of the fluidfoil supports and form a thick sidewall bumper. The resilient, rubber-hose-like bumper tubes 88, strongly inflated with gaseous material of the above-described type, extend the bumper-safety structure on around the cabin, except that this structure optionally may be eliminated at the windowed opening 90, which optionally may be a window or a door. These fairings and bumper tubes aid in fastening the buffer tubes to the cabin wall; and also epoxy or other bonding material securely fastens the buffer tubes to the cabin wall at the vertically curved joints.

Other openings in the cabin walls may be provided, for example the frame-surrounded access hatches 92, which preferably are windowed. The plexiglass or shatter-resistant-glass windows in 90 are fastened within rib 92'; and certain ribs are interrupted and end-bonded to frames around all windowed openings in the top and side walls.

Optionally and preferably, balloon means 94 is utilized to exert additional lift on the cabin and to aid in stabilizing the craft against rolling and pitching motions. This balloon means, containing lighter-than-air gas, comprises a row or set of balloon bags, of balloon fabric or thin, dense plastic or very thin, light-weight metal, which preferably are in a fore-and-aft series with their axes in upright positions. The top of one of these bags is formed to snugly fit beneath the contour of each of the upper fluidfoils (or other upper balloon-supporting elements), and is strongly glued to that element. The bottoms of all the bags preferably are contoured to fit and are glued to the top cabin wall. Optionally, all the space between the cabin and the two upper, balloon-supporting elements may be entirely filled with balloons, within a wide, streamlined upper skin. In this event the lower surface of each of the elements 2 is not aerodynamically contoured, but is in a cabin-skin-conforming plane, to facilitate glue-fastening of the said steamlined upper skin to elements 2; and the upper surfaces of these elements are shaped as in FIG. 3 or FIG. 4.

The attitude and steering of the craft may be controlled by any known type of attitude-control and steering means. For example, these means may comprise common airplane-tail control means, such as are shown in FIG. 1 at the after end of the balloon, supported on the top of the cabin by the strongly-inflated, optionally strongly resilient thin-metal, pipe 96. This pipe is fastened to the after portion of the balloon; and this portion is braced by the strongly-inflated, thin-walled tube 98, optionally resilient, glued to the top of the fluidfoil 100.

Any type of jet or mechanical propulsion of the craft may be utilized. In FIG. 1 mechanical propellers 102 are shown as driven by motors 104, which may be internal combustion engines, or fluid or electric motors powered with fluid via flexible conduits from an engine generator or batteries on the top or the interior of the cabin.

Within the scope of the following claims, various changes in the disclosed structure may be made. For example, wheels or skids may be attached to the lower supports 3, to provide for land or amphibious use of the vehicle. In purely land use of such wheels having bearings on the supporting means 3, this means preferably is not of fluidfoil contour, but has a streamlined cross section of the type shown in FIG. 4.

In the claims, unless otherwise qualified, the term "tubular element" signifies a hollow receptacle of any cross-sectional shape, endless or having spaced ends; the term "tubular member" means a single tubular element of the type specified just above or a straight, curved or annular series of end-connected cans or other tubular elements; "rib member" refers to an elongated construction element which may be endless and curved or quadrilateral, curved with ends or straight with ends and may comprise one curved or straight rib or a plurality of end-connected ribs; "plastic" signifies natural or synthetic rubber or any other plastic; gaseous material means any pure gas, mixture of gases, or gas-cell-containing foam plastic; and "barrel-curved" means: exteriorly curved both in planes thru an axis of the structure referred to and in planes perpendicular to that axis.

I claim:

1. A vehicular, curved, non-circular, load-space-containing structure, having upper, lateral and lower outwardly curved walls, comprising:

fore-and-aft-arranged, non-circular, arcuate, mid-vehicle rib members, substantially defining a mid-vehicle portion of said upper, lateral and lower walls and surrounding at least a portion of said space, each of said members being bowed outward from a vehicular axis extending transversely to the fore-and-aft length of said structure and comprising: four angularly-joined, strength-providing tubular members in said upper, lateral and lower walls, each of said members having an outwardly projecting part in the middle portion of its length; strength-providing means connecting parts of said tubular members in angular, rib-member-strengthening joints, aiding in holding the rib member in non-circular and arcuate shape; gaseous material in said tubular members; an elongated sheath of strength-providing, shape-holding, insulating material around each angularly-joined group of said tubular members, having four end-joined, outwardly bowed sheath parts, each of said members comprising means connecting of said tubular members; and each of said sheaths having opposite flat sides that are juxtaposed to flat sides of adjacent rib members;

fore-and-aft arranged, non-circular, outwardly bowed, barrel-curved bow and stern rib members, each of which extends transversely to the fore-and-aft length of said structure and comprises: strength-providing tubular members in said upper, lateral and lower walls, these bow and stern tubular members having peripheries arranged to conform to the bowed-outward, barrel curvature of said bow and stern rib members; strength-providing means connecting parts of said last-named tubular members in angular, rib-member-strengthening joints, aiding in holding the rib member in non-circular and arcuate shape; gaseous material in said tubular members; an elongated sheath of strength-providing shape-holding, insulating material around each rib-member group of said bow and stern tubular members, having four end-joined, outwardly bowed parts, each of which has a curvature that conforms to rib member curvature; each of said bow and stern member sheaths having opposite flat sides that converge inwardly toward said axis, said bow and stern sheaths of each adjacent pair of rib members having juxtaposed sides; and means strongly connecting each juxtaposed pair of said flat sides;

a windowed element; and means strongly connecting said windowed element to one of said bow rib members.

2. Structure as set forth in claim 1, in which: said mid-vehicle rib members are barrel-curved; and said opposite flat sides of the mid-vehicle rib members converge inwardly, toward said axis.

3. Structure as set forth in claim 1, in which each adjacent pair of said tubular members have axes intersecting at angles to each other.

4. Structure as set forth in claim 1 in which each of said tubular members comprises a set of cans and means connecting the cans together in an endless rib member extending around the longitudinal axis of the said structure.

5. Structure as set forth in claim 1, having at least one interior wall, comprising:

a plurality of bar-like construction elements, comprising tubular members that have parallel axes and sheaths of firm, integral, outer-shape-forming material, surrounding said tubular members; and means bonding said bar-like elements together.

6. Structure as set forth in claim 5, in which each of said bar-like elements comprises a set of end-joined cans and means strongly bonding said cans together.

7. Structure as set forth in claim 1, comprising resilient buffer means on each side of the structure and means connecting said buffer means to at least some of said rib members on each side of the structure.

8. A barrel-curved, quadrilateral rib member of the character described, adapted to be assembled with other similar rib members of a load-holding container, each of which is adapted to extend transversely of a plane containing the axis of the container, the said member having four end-joined parts and a middle space between said parts; the said member comprising:

four tubular members, comprising at least one tubular element in each of said parts, said elements having thin, dense, strength-providing wall material and having peripheries arranged to conform to the barrel-curved, four-sided exterior of the rib member;

gaseous material in said tubular members; and, surrounding said tubular members and forming the outer shape of said curved rib member: firm, strength-providing, molded material, four-sided and barrel-curved in cross sections along planes transverse to axes of the said four parts, having four sides in each of said parts, the exterior one of said sides conforming to the barrel curvature of said rib member; two of said sides being flat at each of said cross sections and converging toward each other from said exterior side to an opposite one of said four sides.

9. A rib member as set forth in claim 8, in which each of said tubular members comprises a row of cans.

10. A rib member as set forth in claim 9, in which: said cans in each row have axes at angles to each other; and said member comprises bonding material connecting ends of said cans.

11. A rib member as set forth in claim 9, in which: said barrel curvature is adapted to conform to barrel curvature of a vehicular cabin; said cans have axes that are substantially in the same plane and angled to each other; and said tubular member comprises strength-providing molded material in wedge-shaped spaces between each adjacent pair of cans in each of said rows.

12. A rib member as set forth in claim 8, in which said molded material comprises cement and lightweight aggregate, and said rib member is adapted to be placed alongside and bonded to a similar rib member in a barrel-curved vehicular cabin.

13. Structure as set forth in claim 1, in which said tubular members comprise sealed, curved tubes that are annular in cross section and gaseous material in the interiors of said tubes.

14. Structure as set forth in claim 3, in which said gaseous material comprises gas under pressure above that of the atmosphere.

15. Structure as set forth in claim 3 in which said gaseous material comprises gas-cell-containing foam plastic.

16. Structure as set forth in claim 8, in which each of said tubular members comprises end-to-end-arranged cans and connecting means of strong material, strongly connecting the said cans.

17. Structure as set forth in claim 16, in which the wall material of said cans comprises metal, and said molded material comprises cement and aggregate.

18. Structure as set forth in claim 16, in which said connecting means comprises a strength-providing strip of strong material and bonding means between said strip and cans.

19. Structure as set forth in claim 16, in which said molded material is cast metal.

20. A load-containing, hollow, barrel-curved vehicular cabin, comprising:

curved, non-circular, outwardly-bowed, juxtaposed rib members, each comprising four arcuate, outwardly bowed, end-joined parts around an axis of said cabin, at least some of said members surrounding a load-containing space, each of said parts comprising a tubular member and having a middle portion that is farther from said axis than its end portions;

in each rib member, a non-circular, arcuate sheath of strenth-providing material around said tubular members, having barrel-curved surfaces that form the outer shape of the rib member and curvingly taper in planes containing said axis and also in planes normal to said axis, from a cross-sectional area of greater bulge of said cabin toward a cabin end of smaller cross-sectional area; and means fastening said rib members together;

each of said rib members having a cross-sectional plane that is substantially normal to said axis and intersects each of said parts, and comprising: four end-joined, unitary tubes, each of which is bowed outward in a middle portion and terminates at each of its ends in a flat end-piece of strength-providing material, joined to the remainder of the tube; strength-providing means connecting each adjacent pair of flat end-pieces togeher, with the axes of each pair of the said tubes at obtuse angles to each other; gaseous material in said tubes; and a gaseous-material inlet on at least one of said tubes.

21. A cabin as set forth in claim 20, in which: said flat end-pieces are hermetically sealed at end edges of and said tubes; said connecting means comprises bonding material; including a gaseous-material inlet on each of the said tubes.

22. A cabin as set forth in claim 21 in which: said gaseous material is gas permanently under above-atmospheric pressure; said tubes comprise dense wall material that is substantially impermeable to gas; and said inlets are permanently sealed against escape of gas.

23. A curved, non-circular, load-space-supporting vehicular structure, having joined upper, lateral and lower curved walls, extending around a vehicular axis, comprising:

arcuately curved, non-cylindrical skin means, exteriorly bowed outward in each of said walls;

within said skin means, a plurality of fore-and-aft arranged arcuate, outwardly bowed wall-frame ribs, each of said ribs encompassing said axis and comprising a sheath of shape-forming material having four end-joined, outwardly curved parts and, within said sheath, four non-coaxial, end-joined tubular members with their axes and portions of their perimeters arranged to substantially conform to the exteriorly bowed curvature of the said skin means, the intersecting axes of said tubular members being in a plane that is substantially normal to said axis, and means for fastening together adjacent pairs of ends of said tubular members in two upper corners and two lower corners at the junctions of said walls; each of said ribs having an outer arc conforming to said bowed curvature, and comprising: at least one can having dense. vehicle-strenth-providing can-wall material; and foam plastic in said cans; and shock-taking means connecting said tubular members and skin means.

24. Structure as set forth in claim 23, in which each of said tubular members comprises an outwardly bowed tube, extending from the said corners to another of said corners.

25. Structure as set forth in claim 23, in which each of said tubular members comprises a plurality of connected, non-coaxial cans, having portions of their perimeters and their axes arranged to substantially conform to the exteriorly bowed curvature of said skin means.

26. A vehicular, non-circular, useful-load-supporting structure, having a vehicular axis and upper, lateral and lower curved walls that extend around said axis and are joined at their ends in two upper wall corners and two lower wall corners, comprising:

arcuately-curved, non-cylindrical skin means, exteriorly bowed outward from said axis in each of said walls;

within said skin means, a plurality of fore-and-aft-arranged, arcuate, outwardly bowed, wall-frame parts, each of said parts encompassing said axis and comprising: four curved, non-coaxial, end-joined tubes and gaseous material within the tubes; each of said tubes comprising dense, strength-providing wall material, tube portions that are outwardly curved relatively to said axis, and tube-end surfaces that are at angles to the center line of the tube's inner space, the said surfaces between each adjacent pair of tube ends, at each of said four corners, being adapted to be fixed to tube-junction means; junction means at each of said four corners for forming a vehicle-strength-providing junction between adjacent tube ends, comprising at least one tube-end piece of strength-providing material and bonding means between said piece and tube-end surfaces; and shape-holding insulating material between said tubes and skin.

27. Structure as set forth in claim 26, in which: said gaseous material comprises gas under above-atmospheric pressure; said junction means has holes extending thru said tube-end piece, providing for gaseous communication between said inner spaces of the tubes; each of said arcuate well-frame parts has a gas inlet for supplying said gas at above atmospheric pressure; and the said structure further comprises bracing means, resisting the tendency of pressurized gas in said arcuate parts to move them into cylindrical form, holding said parts in non-cylindrically arcuate shape.

28. Structure as set forth in claim 27, in which said bracing means comprises: bracing elements, fixed to the inside of said corners; and a fore-and-aft partition, fixed to and between said upper and lower walls.

* * * * *

UNITED STATES PATENT OFFICE
CERTIFICATE OF CORRECTION

Patent No. 3,768,430  Dated October 30, 1973

Inventor(s) Alvin Edward Moore

It is certified that error appears in the above-identified patent and that said Letters Patent are hereby corrected as shown below:

Column 6, line 12 (re page 8 of the original specification, line 13 up from the page bottom), "that" should be -- the --.

Column 9, line 7 (in claim 1), after "connecting" the following omitted word should be inserted -- ends -- (re original claim 42, line 23).

Column 11, line 7, (in claim 20) "strenth" should be -- strength --, as it appeared in original claim 44.

Column 12, line 1 (in claim 23) "strenth" should be -- strength --, as it appeared in original claim 45.

Signed and sealed this 1st day of October 1974.

(SEAL)
Attest:

McCOY M. GIBSON JR.
Attesting Officer

C. MARSHALL DANN
Commissioner of Patents